Patented May 3, 1932

1,856,571

UNITED STATES PATENT OFFICE

CORNELIS LOURENS, OF AMSTERDAM, NETHERLANDS, ASSIGNOR TO GENERAL NORIT COMPANY, LIMITED, OF AMSTERDAM, NETHERLANDS, A CORPORATION OF THE NETHERLANDS

PROCESS FOR TREATING LIQUIDS WITH ACTIVE CARBONS

No Drawing. Application filed December 26, 1923, Serial No. 682,830, and in the Netherlands May 9, 1923.

This invention relates to improvements in the treatment of non-aqueous liquids with improved active carbons.

The present invention consists in a process of treating non-aqueous liquids or solutions e. g. oils and fats, by an initially acid active carbon or a mixture of acid active carbon with another adsorbent. The acid active carbons utilized are prepared from active carbons by adding acid thereto in pre-determined amount, leaving practically the whole of the acid in the carbon and without removing any substantial amount of ash (mineral constituents) when acid carbons can be obtained which are particularly suitable for decolorizing oils and fats.

The invention particularly includes the use of adsorbing agents prepared by the treatment with acid gases of active carbons made by heat and the action of activating gases with or without the addition of solid or liquid activating substances. The initially acid active carbons used in the present process should contain substantial quantities of acid, i. e. quantities greater than the traces which remain adsorbed after treating with an excess of an aqueous acid solution, separation and prolonged washing of the wet acid carbon with water as heretofore practiced for the removal of mineral or organic impurities or both. The invention also includes various specific processes as hereafter described.

It is proposed first to describe the process of preparing the active carbon employed in the present process and then to describe the new methods of employing acid active carbons for the treatment of non-aqueous liquids in accordance with a preferred form of the present invention.

The term "active carbon" is applied to substances such as have hitherto been prepared by many processes including distillation by heat, and the action of activating solid, liquid or gaseous substances upon carbonaceous materials of animal, vegetable or mineral origin; such activating substances are e. g., chlorides, sulphates, carbonates, acetates, nitrates, alkaline substances, acids, albumin solutions, steam, carbonic acid, flue gases, chlorine etc. These products are distinguished by a much greater activity than ordinary bone char.

It has been suggested to wash or boil such active carbons in suspension with water to remove e. g. acid or with a dilute acid solution to remove inorganic ash such as alkali metal carbonates and alkaline earth metal carbonates, and then to wash the carbon until substantial neutrality of the wash water. The necessary filtration is difficult and it is not easy to dry the resulting product.

According to my process, a predetermined quantity of acid is added to active carbon either fresh or regenerated and practically the whole of this acid is left in the carbon; usually a substantial amount of acid is left e. g. $\frac{1}{2}$ to 5%. Said addition of acid does not aim at the removal of ash, but aims at the impregnation of the carbon with acid, so that in the practice of the invention any washing out or removal of ash may be dispensed with.

Thus if the carbon is obtained in the form of lumps of granules, it may be treated either in a continuous or a discontinuous process with a calculated quantity of acid either in a gaseous or in a dissolved or liquid state, dried, if required, and ground or employed in the lump form. Alternatively the material may be first ground and then treated (either alone or mixed with one or more other adsorbents) with the acid.

Thus the active carbon may be heated and agitated with the necessary quantity of acid liquor (under reduced, normal or increased pressure) and may then be separated in known manner and partly washed if desired. Or a solution of acid may be sprayed on the material. The washing should not be carried so far as to relieve the active carbon of the proportions of acid contemplated by the present invention.

As mentioned, a large excess of acid is frequently added to produce a relatively strongly acid carbon and in some cases if an acid solution is employed, the acid active carbon or mixture with an inert adsorbent can be used in the form of a moist paste.

Suitable acids are hydrochloric acid, sulphuric acid, nitric acid, acetic acid, phosphoric acid, tartaric acid and sulphur dioxide, but other acids may be employed. Usually the best results are obtained by the use of volatile acids, especially hydrochloric acid, but the choice of acid depends on the nature and previous treatment of the material to be treated. Due to the catalytic action of the carbon, sulphur dioxide will in many cases be changed into sulphuric acid. Also, if impregnating carbon with chlorine, this latter may be (owing to a catalytic process) converted into hydrochloric acid.

Good results are obtained by treating active decolorizing carbon obtained by gas activation of material of vegetable origin which product possesses a fibrous or needle like structure. A preferred procedure is to treat the active carbon with hydrochloric acid as or after it leaves the activating or revivifying retorts.

As an example, an excess of 0.5 to 1% hydrochloric acid may be left in the carbon, but for certain purposes much larger quantities are most suitable. The volatile acid may be dried or not, before use.

The process avoids loss in acid and the serious practical difficulties which result from filtering the acid liquid and washing the material and it may also do away with the subsequent drying. It is found that novel results can be obtained by using such acid carbons for the treatment of vegetable and animal fats or oils and other liquids, e. g. hydrocarbons, waxes and other non-aqueous bodies or solutions.

I have found that if certain non-aqueous liquors, e. g. oils and fats and the like, are treated with active carbon in the ordinary way, unsatisfactory results are often obtained. I am inclined to think that as far as oils and fats are concerned this may be partially due to soap formation between alkaline materials when present in the ash of the active carbon and either neutral oil or free fatty acid present in the oil, and moreover, even if no alkaline substances are present in the carbon and the oil or fat does not contain soap as such, an increased activity is obtained with acid carbon as compared with a neutral, alkali free product, but whether the first explanation is correct or not, it is certainly a fact that in many cases I have been able to secure more efficiency by treating oils and fats with an acid active carbon which is conveniently though not necessarily prepared by the above described process. The acid (and moisture) may cause some beneficial change in the surface tension of the carbon.

A few simple comparative experiments should be made to determine the best kind of acid and the most suitable amount to employ with a particular oil.

The process may also be practiced with mixtures of active carbon with other adsorbents, e. g. a bleaching earth, as fuller's earth. Thus an acid mixture containing 20% active carbon and 80% fuller's earth can be employed. Although a dry initially acid active carbon or mixture may be employed, I have found that in some cases the presence of water actually facilitates the result, also with respect to the filtration, and often that even a moist paste can be used.

The oil or molten fats may be treated under reduced pressure with agitation at temperatures e. g. above 60° C. and in some cases at materially higher temperatures. As examples of fatty substances may be mentioned olive oil, certain cocoanut oil, rape oil, cottonseed oil, palm oil, palm kernel oil, soya oil, sesame oil, certain whale oils, linseed oil, and liquid fatty acids.

The quantity of acid present in the active carbon may be varied considerably depending on the material to be treated and the amount of carbon added, e. g. between 0.1 to 5% acid calculated upon the carbon though the invention is not limited to these proportions. In some cases I have found that the result is not so good if a very large quantity of acid is present.

Acid active carbon will sometimes contain salts resulting from neutralization of the salt forming bodies contained in the carbons.

The time of action must be controlled by watching the progress of the action, which depends inter alia on the nature of the liquid under treatment, the temperature, moisture of the oil or the carbon or mixture, the presence of air, or the vacuum applied, the velocity of agitation.

In treating oils and fats, the mass should show acid reaction with litmus when the carbon is made into a paste with water.

Sometimes the oil may be first treated with an alkaline active carbon or other adsorbents or mixture and then, if desired, after separation, with acid active carbon.

It has proved of advantage in many cases to over-saponify the fatty acids (that is the oil is treated with more alkali than the quantity required for neutralization of the free fatty acids) in this manner by the treatment with alkali alone e. g. $NaOH$ or $Na_2CO_3$, and in some cases the alkali may modify the colouring matter so that it is more readily adsorbed in the subsequent process. In this way there remains in the oil an excess of alkali which is then neutralized and absorbed by the acidified active carbon. The soap formed may or may not be washed out, as desired.

Example 1

Deacidified rape oil is treated with 2% of decolourizing carbon containing 1% (calculated on the carbon) of hydrochloric acid with continual stirring for half an hour in a bleaching vessel in a partial vacuum at a temperature of about 80° C. The mixture is somewhat cooled and the carbon separated by filter pressing when a substantially colourless oil is obtained. The decolourizing action is much better than if neutral or alkaline carbon is employed.

The acid mixture of 15–25% decolourizing carbon and 75–85% bleaching earth can also be employed.

Example 2

A bad sample of greenish deacidified (neutral) olive oil (2nd pressing) is treated with 1% of freshly prepared moist active carbon impregnated with 0.5–1% $SO_2$ and 25% water, when a clear oil is obtained by treatment as in Example 1.

Goods results are obtained by using carbons possessing a definite and recognizable microscopic structure derived from the vegetable raw material, e. g. those made by gas activation and sold under the registered trade-mark "Norit".

I declare that what I claim is:

1. The process which comprises treating a non-aqueous liquid with active decolorizing carbon containing an appreciable amount of free acid greater than traces.

2. The process which comprises, treating a non-aqueous liquid with active decolorizing carbon containing a substantial amount of volatile free acid.

3. The process of treating oils and the like which comprises contacting such material with active carbon rendered acid by previous impregnation with acid and having an acidity in the amount of from about 0.1 to about 5.0%.

4. The process of treating an oil containing glycerides of fatty acids which comprises contacting the oil with active carbon previously rendered of acid reaction by impregnation with acid, the amount of acidity being of the magnitude of from about 0.1% to 5.0%.

5. The process of treating animal and vegetable oils which comprises contacting such oils with active carbon previously incorporated with an acid to an acid reaction in water towards litmus, said acidity being in an amount greater than traces.

6. The process of treating animal and vegetable oils which comprises contacting such oils with active carbon previously associated with an acid in such an amount that an excess of not less than substantially 0.1% remains in the carbon.

7. The process of treating animal or vegetable oils which comprises bringing such an oil in contact with active carbon containing prior to such contact more than about 0.1 per cent acid.

8. The process of treating non-aqueous liquids which comprises bringing such a liquid in contact with active carbon containing prior to such contact acid in such proportions as to show an acid reaction in water towards litmus, said acid being present in said carbon in excess of mere traces.

In testimony whereof I affix my signature.

CORNELIS LOURENS.